(12) United States Patent
Hux

(10) Patent No.: US 7,230,617 B2
(45) Date of Patent: Jun. 12, 2007

(54) VOXEL CENTER SMOOTHING

(75) Inventor: William A. Hux, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 741 days.

(21) Appl. No.: 10/338,799

(22) Filed: Jan. 7, 2003

(65) Prior Publication Data

US 2004/0130548 A1  Jul. 8, 2004

(51) Int. Cl.
*G06T 17/00* (2006.01)

(52) U.S. Cl. ............... 345/424; 345/419; 345/420; 345/421; 382/131

(58) Field of Classification Search ......... 345/419, 345/424, 420, 421; 382/131
See application file for complete search history.

(56) References Cited

U.S. PATENT DOCUMENTS

| | | |
|---|---|---|
| 5,442,733 A | 8/1995 | Kaufman et al. |
| 5,898,793 A | 4/1999 | Karron et al. |
| 6,342,886 B1 | 1/2002 | Pfister et al. |
| 6,867,773 B2 * | 3/2005 | Hux ............ 345/424 |
| 2003/0052875 A1* | 3/2003 | Salomie ......... 345/419 |

2004/0130547 A1  7/2004  Hux

OTHER PUBLICATIONS

"Marching Cubes: A High Resolution 3D Surface Construction Algorithm"; William E. Lorensen, Harvey E. Cline; Computer Graphics; Siggraph '87 Conference Proceedings; Jul. 27-31, 1987; vol. 21, No. 4; Jul. 1987; ACM Siggraph; pp. 163-169.
"Rapid Octree Construction from Image Sequences"; Richard Szeliski; Image Understanding; ISSN 1049-9660; vol. 58, No. 1, Jul. 1993; Academic Press, Inc.; pp. 23-32.
"Surface reconstruction from Unorganized Points"; Hugues Hoppe et al.; Computer Graphics Proceedings; Siggraph '92; vol. 26, No. 2, Jul. 1992; pp. 71-78.
Automatic Reconstruction of 3D Objects Using a mobile Monoscopic Camera; W. Niem, et al.; Proceedings International Conference on Recent Advances in 3-D Digital Imaging and Modeling; May 12-15, 1997; National Research Council Canada; pp. 173-180.

* cited by examiner

*Primary Examiner*—Kimbinh T. Nguyen
(74) *Attorney, Agent, or Firm*—Fish & Richardson P.C.

(57) ABSTRACT

A method of generating a pre-mesh includes locating a reference voxel, which is inside a surface of an object and is adjacent to a voxel outside the surface of the object. The method also includes determining a set of contributing voxels by finding adjacent voxels on a same surface as the reference voxel using voxel morph operators, averaging centers of each of the contributing voxels and the reference voxel, and using the average of the centers as a new center of the reference voxel.

30 Claims, 8 Drawing Sheets

VOXEL CENTER SMOOTHING

TECHNICAL FIELD

This disclosure relates to three-dimensional (3D) graphics and, in particular, to voxel smoothing.

BACKGROUND

A two-dimensional area (2D) can be divided into square units called pixels. Likewise, a 3D volume can be divided into cubical units called voxels. In much the same way that a camera can be used to create a 2D pixel representation of a real-world object by taking a picture, a 3D voxel representation of a real-world object can be constructed by taking many pictures of an object from different angles. Other techniques for generating a 3D voxel representation include using laser range-finding techniques.

Typically, the voxel representations are depicted in a voxel space as cubes. The voxel representation is not the end result because a collection of cubes does not produce a realistic view of an object. Hence, a technique of converting voxel data into a smooth surface suitable for rendering on modern graphics hardware is required.

DESCRIPTION

Figure 1:
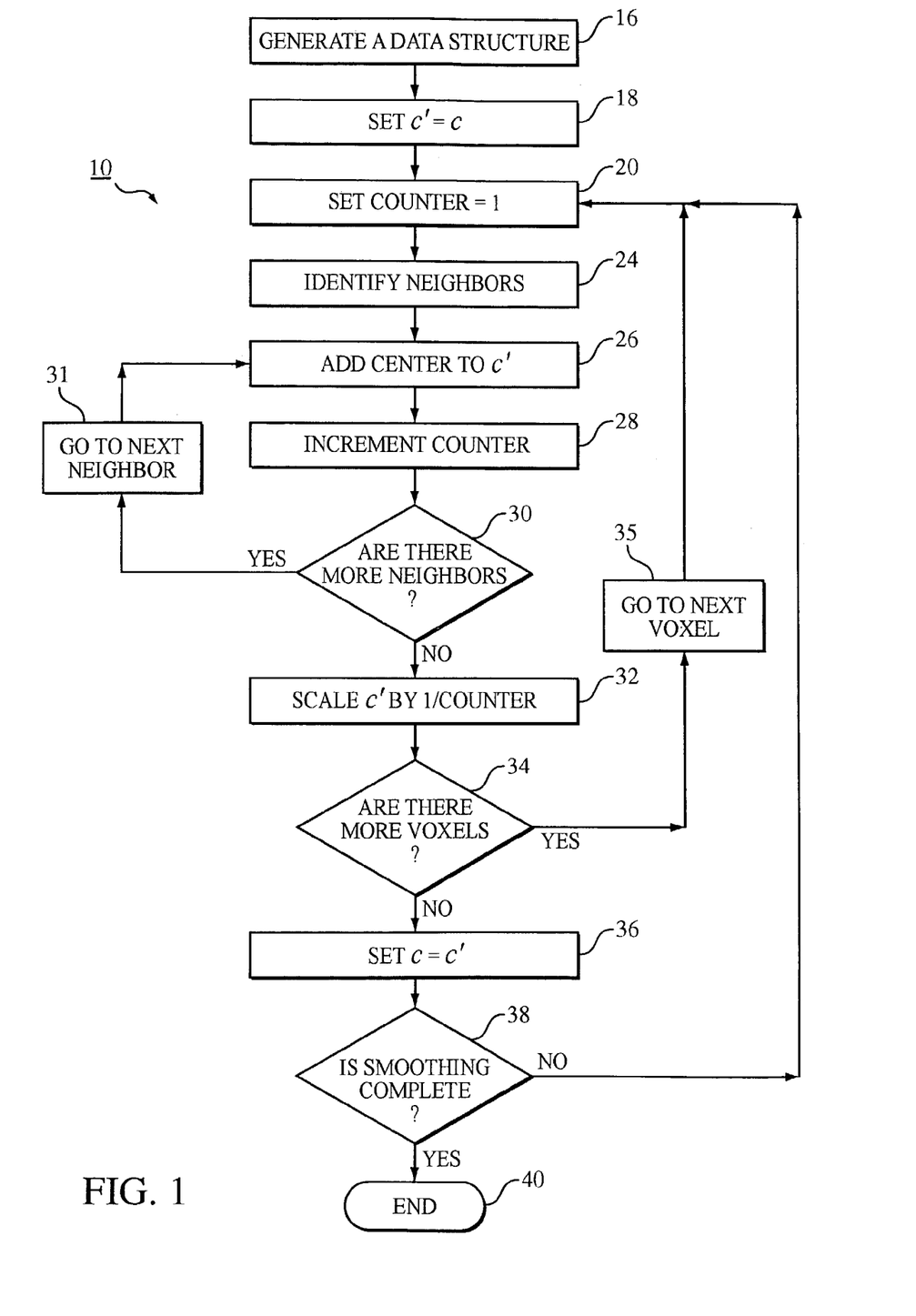
FIG. 1 is a flowchart of a process for voxel center smoothing.
Figure 2:
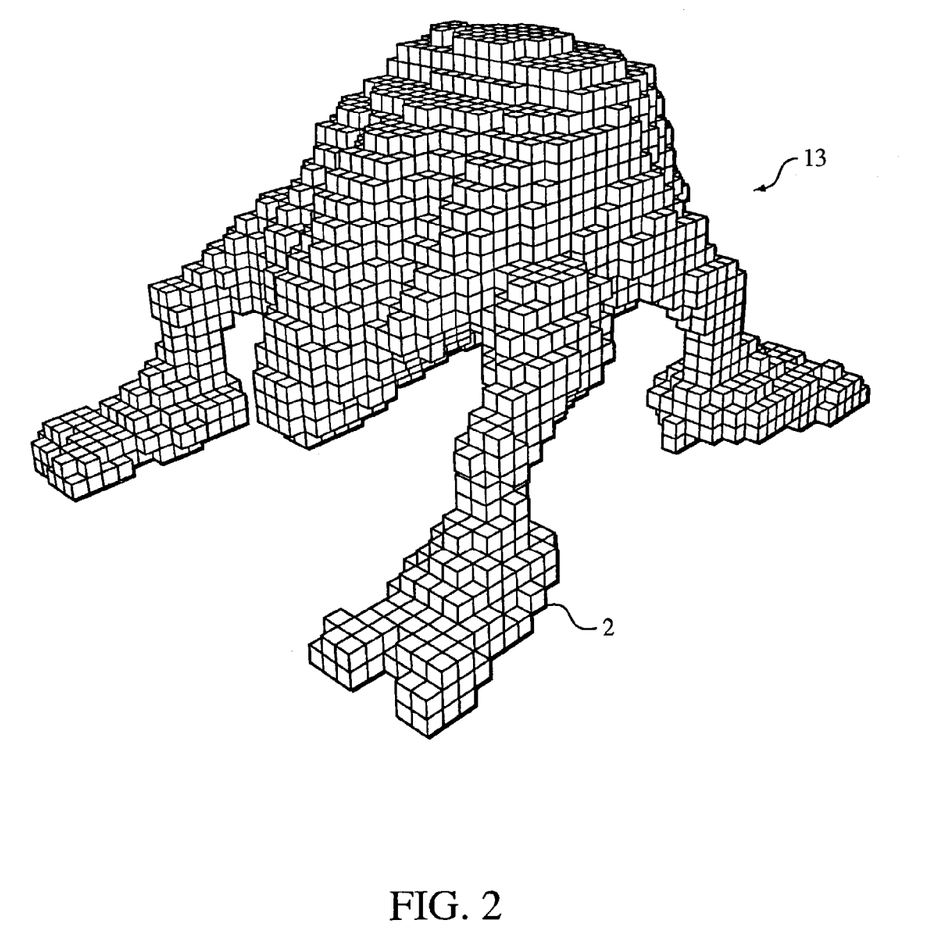
FIG. 2 is a voxel representation of a creature prior to using the process in FIG. 1.

Referring to FIGS. 1 and 2, a process 10 performs voxel center smoothing in a voxel representation. The voxel representation contains cubically shaped voxels that are labeled either an "inside" voxel or an "outside" voxel. The "inside" voxels are inside a surface of the real-world object. The "outside" voxels are outside the surface of the real-world object. For example, a creature representation 13 has inside voxels 2 and outside voxels (not shown). Inside voxels 2 are depicted in FIG. 2 as gray cubes while the outside voxels are invisible. When a side of inside voxel 2 is adjacent to the outside voxel, that side is exposed. Thus, in FIG. 2, all the inside cubes that are visible have at least one exposed surface. Process 10 analyzes the exposed voxel cubes and determines a modified center for each exposed voxel, which lies on the surface of the real world object. Each modified voxel center is an average of the actual center of the exposed voxel and centers of neighboring voxel also on the same surface of the real world object. Thus, process 10 generates a pre-mesh. The pre-mesh with the modified centers can be used with other techniques to form a smooth mesh.

Figure 3:
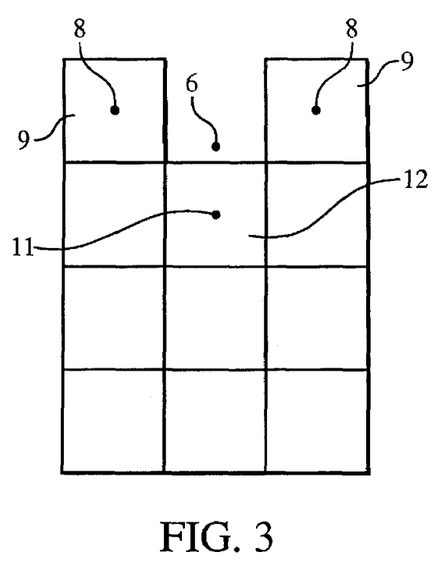
FIG. 3 is a two-dimensional representation of voxel centers and a modified voxel center.

Referring to FIG. 3, for each exposed voxel, process 10 is performed to determine a modified voxel center 6. The determination is based on averaging centers 8 of voxels 9, which lie on a surface of the real world object and surround an exposed voxel 12, and a center 11 of exposed voxel 12. Thus, modified voxel center 6 resides on a smooth surface.

Process 10 generates (16) a data structure corresponding to the exposed voxel. The data structure includes two vectors, c, which represents the center of the exposed voxel in 3-dimensional space, and c', which represents a temporary vector used in calculating a modified center. Process 10 sets (18) c' equal to c for a voxel in a scene. Process 10 sets (20) a counter equal to one. Process 10 identifies (24) which voxels surrounding the exposed voxel, also called neighboring voxels, contribute to the same surface as the voxel.

Figure 4:
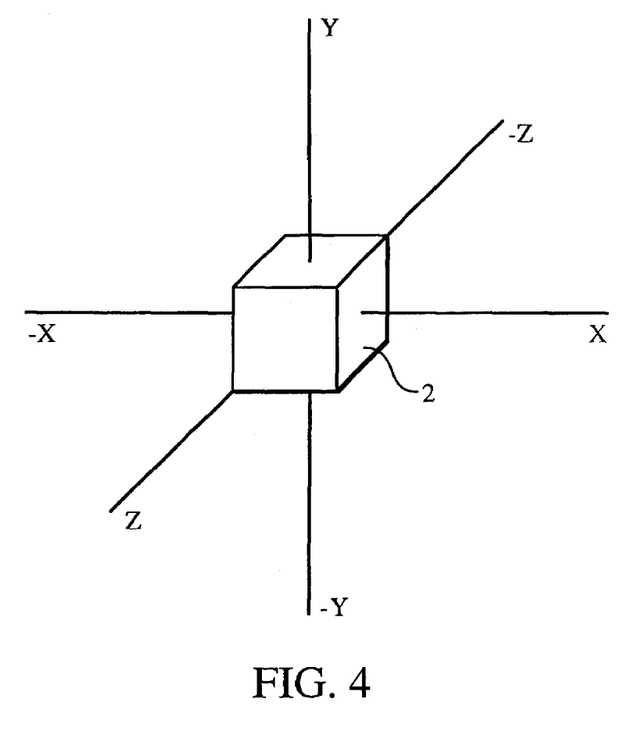
FIG. 4 is a diagram of six directions with respect to a voxel.

Referring to FIG. 4, the voxels are evaluated one-at-a-time so that when a voxel is being evaluated it is called a reference voxel. Consider that each side of an inside voxel 2 represents a direction so that there are six directions such as x, −x, y, −y, z and −z directions. Process 10 identifies (24) in each of the six directions, which voxels neighboring the reference voxel contribute to the same surface of the reference voxel. An exemplary process for identifying (24) neighboring voxels that are on the same surface as the reference voxel is shown in detail in FIG. 5.

Figure 5:
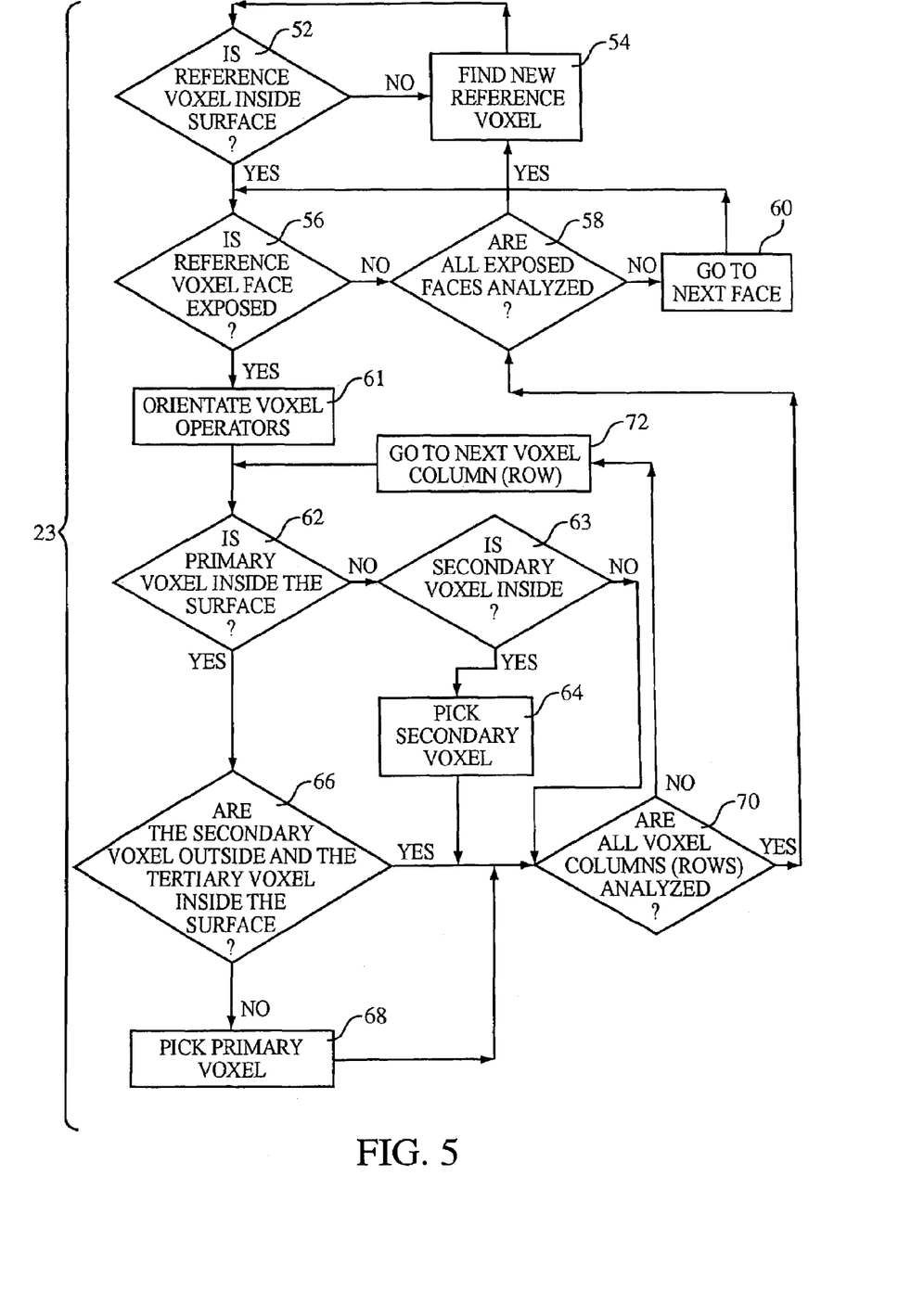
FIG. 5 is a flowchart for a process to identify voxels in the same surface as a reference voxel.

A subprocess 23 determines if the reference voxel has an exposed face, then subprocess 23 determines which voxels adjacent to the reference voxel contribute to the same surface as the reference voxel. Subprocess 23 uses voxel morph operators to determine which voxels contribute to the same surface as the reference voxel.

Subprocess 23 determines (52) if the reference voxel is an inside voxel or an outside voxel by analyzing how the voxel was assigned in the voxel representation. If the reference voxel is not an inside voxel (i.e., an outside voxel), subprocess 23 finds (54) the next reference voxel. If the reference voxel is an inside voxel, then starting in one of the six directions, subprocess 23 determines (56) if the side has an exposed face by determining if the inside voxel is adjacent to an outside voxel.

If the side is not an exposed face, subprocess 23 determines (58) if all exposed sides (faces) of the reference voxel have been checked. If not, subprocess 23 goes (60) to another side of the reference voxel not checked. If all exposed sides of the reference voxel have been analyzed, subprocess 23 finds (54) a new reference voxel not already analyzed.

If the reference voxel has an exposed face, then subprocess 23 determines which voxels adjacent to the reference voxel contribute to the same surface as the reference voxel. Subprocess 23 uses voxel morph operators, such as those described below, to make this determination.

Figure 6A:
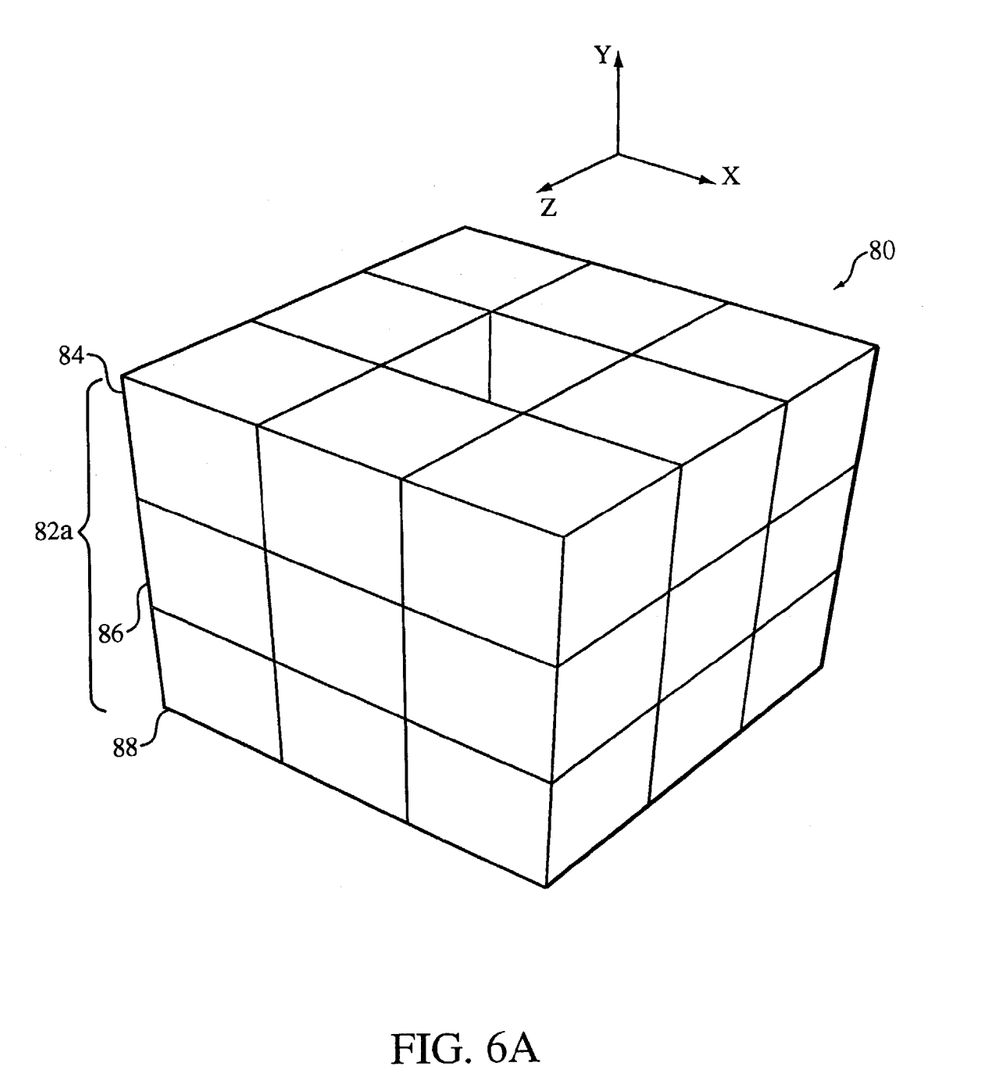
FIG. 6A is a view of a voxel operator in the y-direction.
Figure 6B:
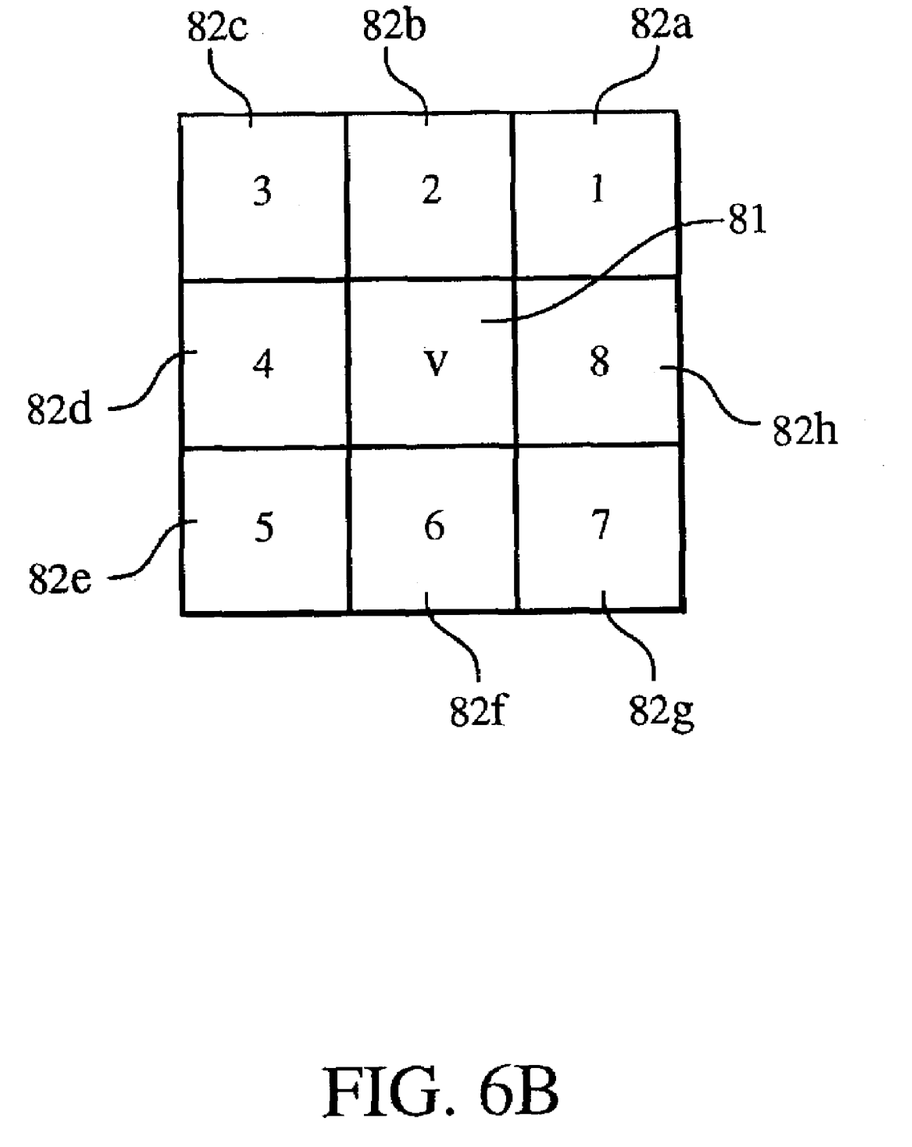
FIG. 6B is a top view of the voxel operator.

Referring to FIGS. 6A and 6B, to understand voxel morph operators, consider a reference voxel 81 (FIG. 6B) located in the center of a three by three by three (3×3×3) cube 80. Also, assume that the voxel (not shown) above (y-direction) and adjacent to reference voxel 81 is an outside voxel and therefore 3×3×3 cube 80 is in a y-operator position. In the y-operator position, the voxel above reference voxel 81 and the voxel below the reference voxel are then ignored. Thus, 3×3×3 cube 80 includes eight columns 82 (e.g., voxel column 82a, voxel column 82b, voxel column 82c, voxel column 82d, voxel column 82e, voxel column 82f, voxel column 82g and voxel column 82h) of three voxels each and reference voxel 81 in the center of the 3×3×3 cube. Each column 82 has a primary voxel 84 on top, a secondary voxel 86 in the middle and a tertiary voxel 88 on the bottom. Subprocess 23 analyzes the eight columns 82 of voxels one at a time in a counterclockwise fashion to determine which of the three voxels (primary voxel 84, secondary voxel 86, and tertiary voxel 88) in column 82 are on the same surface as reference voxel 81.

If the next exposed face to be analyzed were in the x-direction, 3×3×3 cube 80, excluding the reference voxel, would rotate so that the primary voxels are facing the x-direction. What rotates is not the actual voxel themselves, but the voxel operators or what is designated as a primary voxel, a secondary voxel and a tertiary voxel. Therefore, instead of having columns of voxels to analyze, there would be rows. In other words, a voxel that is a primary voxel in one direction, may be a tertiary voxel in another direction.

Referring back to FIG. 5, after determining that a reference voxel is exposed, subprocess 23 orientates the voxel operators. Subprocess 23 determines (62) if the primary voxel is an inside voxel. If it is not, subprocess 23 determines (63) if the secondary voxel is inside the surface. If the secondary voxel is inside the surface, subprocess 23 picks (64) the secondary voxel. If primary voxel 84 is an inside voxel, subprocess 23 determines (66) if the secondary voxel 86 is an outside voxel and the tertiary voxel 88 is an inside voxel. If secondary voxel 86 is an outside voxel and tertiary voxel 88 is an inside voxel, subprocess 23 does not pick any voxel. If secondary voxel 86 is not an outside voxel or tertiary voxel 88 is not an inside voxel, subprocess 23 picks (68) the primary voxel.

After a column of voxels (or rows depending on the orientation of the voxel operators) has been analyzed, subprocess 23 determines (70) if all eight voxel columns have been analyzed. If all eight columns have been analyzed, subprocess 23 determines (58) if there are any more exposed faces left to be analyzed. If more columns remain, subprocess 23 (72) goes to the next column. Every time a voxel is picked by subprocess 23, it is tagged as a contributing neighbor to the reference voxel.

Referring back to FIG. 1, for each neighbor voxel identified, process 10 adds (26) a center of the neighbor voxel to c'. Process 10 increments (28) the counter once for each neighbor voxel. Process 10 determines (30) if there are any neighbor voxels left. If there are additional neighbors left, process 10 goes (31) to the next neighbor. After all the neighbor voxels have been evaluated, process 10 scales (32) c' by 1 over the counter value. In other words, c' is an average of all the centers of each of the contributing neighbor voxels. Process 10 determines (34) if there are more voxels in the scene to evaluate. If there are more voxels, process 10 goes (35) to the next voxel. If not, process 10 sets (36) c equal to c' for each voxel in the scene. Process 10 determines (38) if the smoothing is complete. Typically, this depends on the user's needs. If smoothing is not complete, process 50 repeats the previous actions. The previous actions can be repeated between two to four times times. Typically, three passes yield an exceptionally smooth set of center values. Two passes yields coarser surface values but with better preservation of surface detail. In some cases, it is desirable to always set c' equal to the voxel center to prevent some features from being completely smoothed away.

Figure 7A:
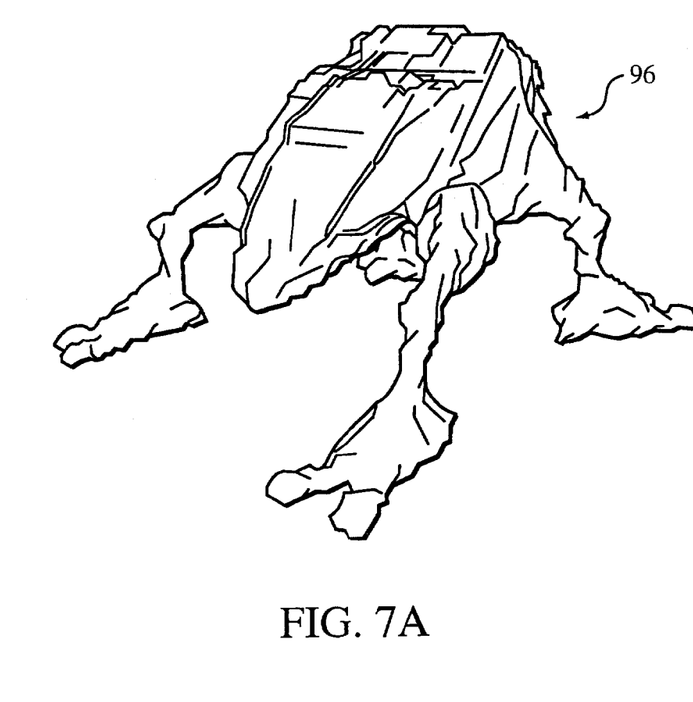
FIG. 7A is a view of a mesh of FIG. 2 without using the process in FIG. 1.
Figure 7B:
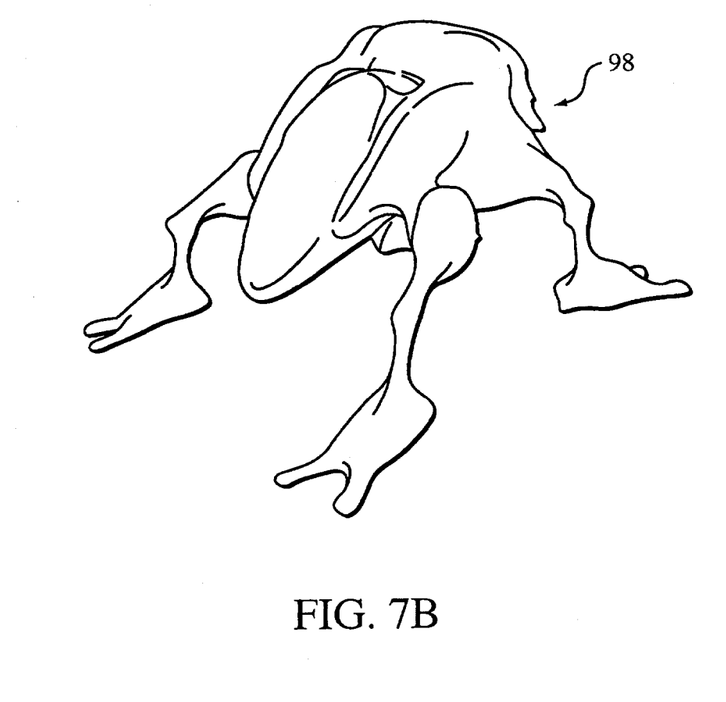
FIG. 7B is a view of a mesh of FIG. 2 using the process in FIG. 1.

FIG. 7A shows creature 13 of FIG. 2 as a mesh 96 without using process 10. FIG. 7B shows creature 13 of FIG. 2 as a mesh 98 after process 10 is used.

Figure 8:
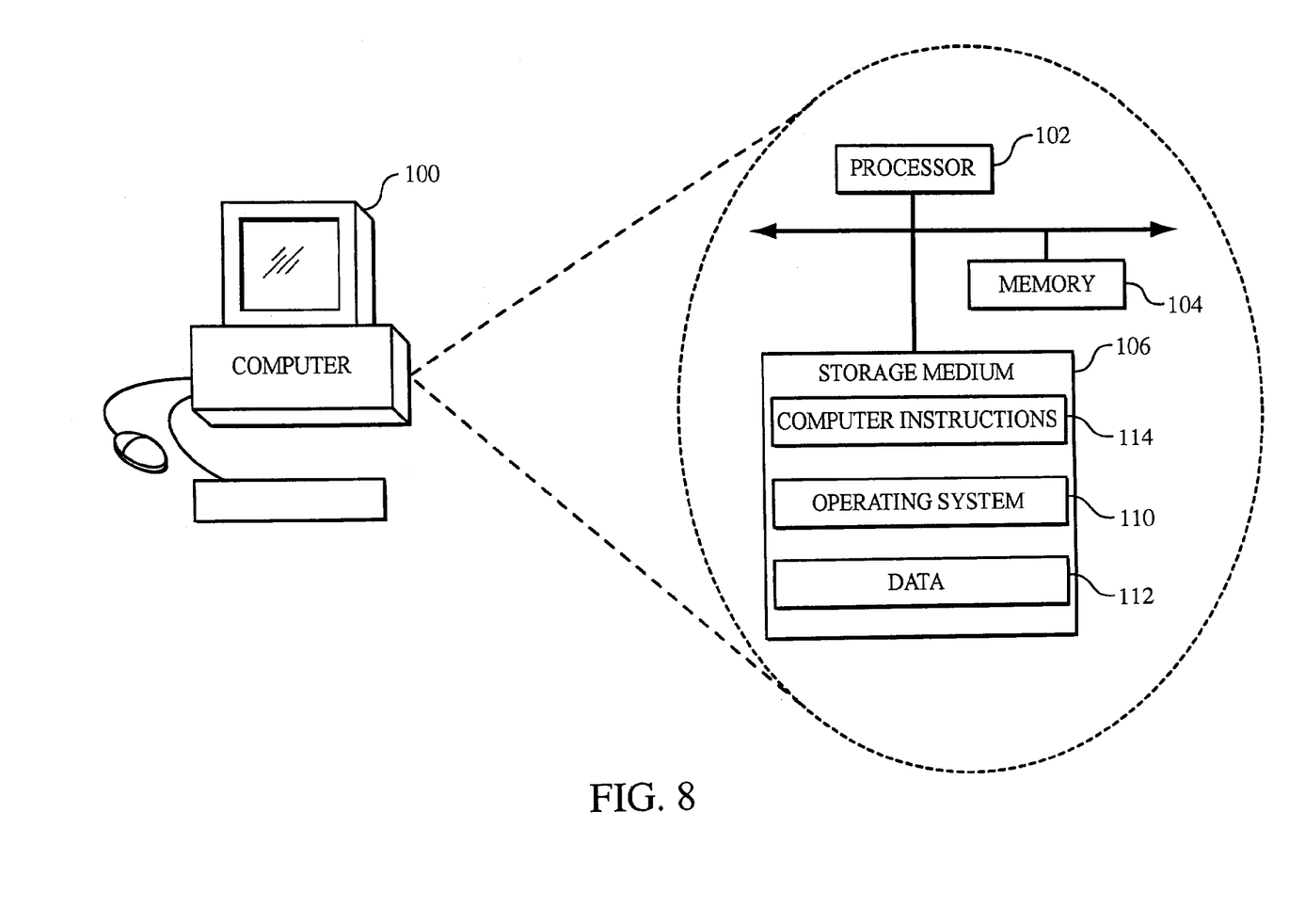
FIG. 8 is a block diagram of a computer system on which the process of FIG. 1 may be implemented.

FIG. 8 shows a computer 100 for voxel center smoothing using process 10. Computer 100 includes a processor 102, a memory 104, and a storage medium 106 (e.g., hard disk). Storage medium 106 stores operating system 110, data 112 for voxel centers and temporary voxel centers, and computer instructions 114 which are executed by processor 102 out of memory 104 to perform process 10.

Process 10 is not limited to use with the hardware and software of FIG. 8; it may find applicability in any computing or processing environment and with any type of machine that is capable of running a computer program. Process 10 may be implemented in hardware, software, or a combination of the two. For example, process 10 may be implemented in a circuit that includes one or a combination of a processor, a memory, programmable logic and logic gates. Process 10 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 10 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium or device (e.g., CD-ROM, hard disk, or magnetic diskette) that is readable by a general or special purpose programmable computer for configuring and operating the computer when the storage medium or device is read by the computer to perform process 10. Process 10 may also be implemented as a machine-readable storage medium, configured with a computer program, where upon execution, instructions in the computer program cause the computer to operate in accordance with process 10.

The process is not limited to the specific embodiments described herein. For example, the voxels do not need to be uniform in size nor do the voxels need to be cubical. Also, the voxel morph operators need not be in a 3×3×3 cube. For example, the voxel morph operators can be in a pyramid configuration. Also, the calculation of the voxels centers can be done in any coordinate system including Cartesian, cylindrical, or spherical coordinate systems. The process is not limited to the specific processing order of FIGS. 1 and 5. Rather, the blocks of FIGS. 1 and 5 may be re-ordered, as necessary, to achieve the results set forth above.

Other embodiments not described herein are also within the scope of the following claims.

What is claimed is:

1. A method of generating a pre-mesh, comprising:
   locating a reference voxel, the reference voxel being inside a surface of an object and being adjacent to a voxel outside the surface of the object;
   determining a set of contributing voxels by finding adjacent voxels on a same surface as the reference voxel using voxel morph operators;
   averaging centers of each of the contributing voxels and the reference voxel; and
   using the average of the centers as a new center of the reference voxel.

2. The method of claim 1, further comprising:
   generating a data structure, the data structure having a variable, c, representing a center of the reference voxel and a temporary variable, c'.

3. The method of claim 2, further comprising:
   setting c' equal to c.

4. The method of claim 3, wherein averaging the centers of each of the contributing voxels and the reference voxel comprises adding the centers of each of the contributing voxels to c'.

5. The method of claim 4, wherein averaging the centers of each of the contributing voxels and the reference voxel comprises scaling c' by one over the number of contributing voxels.

6. The method of claim 1, wherein determining comprises:
  evaluating a primary voxel corresponding to a side of a reference voxel, the side of the reference voxel being attached to an outside voxel, the primary voxel being adjacent to the outside voxel and adjacent to a corresponding secondary voxel, the secondary voxel being adjacent to a corresponding tertiary voxel; and
  determining whether the primary voxel, the secondary voxel or the tertiary voxel is on a same surface as the reference voxel.

7. The method of claim 6, further comprising:
  evaluating up to eight primary voxels for each side of the reference voxel that is attached to the outside voxel; and
  sing a three by three by three (3×3×3) volume of voxels to include the eight primary voxels, the corresponding eight secondary voxels, and the corresponding eight tertiary voxels, the reference voxel being in the center of the 3×3×3 volume.

8. The method of claim 7, wherein determining whether the primary voxel, the secondary voxel or the tertiary voxel is on a same surface as the reference voxel comprises picking the primary voxel if the primary voxel is inside the surface of the object unless the corresponding secondary voxel is outside the surface of the object and the corresponding tertiary voxel is inside the surface of the object.

9. The method of claim 7, wherein determining whether the primary voxel, the secondary voxel or the tertiary voxel is on a same surface as the reference voxel comprises picking the secondary voxel if the primary voxel is outside the surface of the object and the secondary voxel is inside the surface of the object.

10. The method of claim 7, wherein determining whether the primary voxel, the secondary voxel or the tertiary voxel is on a same surface as the reference voxel comprises picking no voxels if the corresponding secondary voxel is outside the surface of the object and the corresponding tertiary voxel is inside the surface of the object.

11. An apparatus comprising: circuitry, for generating a pre-mesh, to:
  locate a reference voxel, the reference voxel being inside a surface of an object and being adjacent to a voxel outside the surface of the object;
  determine a set of contributing voxels by finding adjacent voxels on a same surface as the reference voxel using voxel morph operators;
  average centers of each of the contributing voxels and the reference voxel; and
  use the average of the centers as a new center of the reference voxel.

12. The apparatus of claim 11, wherein the circuitry comprises at least one of a processor, a memory, programmable logic and logic gates.

13. The apparatus of claim 11, further comprising circuitry to:
  generate a data structure, the data structure having a variable, c, representing a center of the reference voxel and a temporary variable, c'.

14. The apparatus of claim 13, further comprising circuitry to:
  set c' equal to c.

15. The apparatus of claim 14, wherein circuitry to average the centers of each of the contributing voxels and the reference voxel comprises circuitry to add the centers of each of the contributing voxels to c'.

16. The apparatus of claim 15, wherein circuitry to average the centers of each of the contributing voxels and the reference voxel comprises circuitry to scale c' by one over the number of contributing voxels.

17. The apparatus of claim 11, wherein circuitry to determine comprises circuitry to:
  evaluate a primary voxel corresponding to a side of a reference voxel, the side of the reference voxel being attached to an outside voxel, the primary voxel being adjacent to the outside voxel and adjacent to a corresponding secondary voxel, the secondary voxel being adjacent to a corresponding tertiary voxel; and determine whether the primary voxel, the secondary voxel or the tertiary voxel is on a same surface as the reference voxel.

18. The apparatus of claim 17, further comprising circuitry to:
  evaluate up to eight primary voxels for each side of the reference voxel that is attached to the outside voxel; and
  use a three by three by three (3×3×3) volume of voxels to include the eight primary voxels, the corresponding eight secondary voxels, and the corresponding eight tertiary voxels, the reference voxel being in the center of the 3×3×3 volume.

19. The apparatus of claim 18, wherein circuitry to determine whether the primary voxel, the secondary voxel or the tertiary voxel is on a same surface as the reference voxel comprises circuitry to pick the primary voxel if the primary voxel is inside the surface of the object unless the corresponding secondary voxel is outside the surface of the object and the corresponding tertiary voxel is inside the surface of the object.

20. The apparatus of claim 18, wherein circuitry to determine whether the primary voxel, the secondary voxel or the tertiary voxel is on a same surface as the reference voxel comprises circuitry to pick the secondary voxel if the primary voxel is outside the surface of the object and the secondary voxel is inside the surface of the object.

21. The apparatus of claim 18, wherein circuitry to determine whether the primary voxel, the secondary voxel or the tertiary voxel is on a same surface as the reference voxel comprises circuitry to pick no voxels if the corresponding secondary voxel is outside the surface of the object and the corresponding tertiary voxel is inside the surface of the object.

22. An article comprising a data storage device that stores executable instructions for generating a pre-mesh, the instructions causing a data processing device to:
  find a reference voxel, the reference voxel is inside an object and is adjacent to a voxel outside a surface of the object, the reference voxel having a center;
  determine a set of contributing voxels by finding adjacent voxels that are on the same surface as the reference voxel using voxel morph operators, each contributing voxel having a center;
  average the centers of each of the contributing voxels and the reference voxel; and
  use the average of the centers as a new center of the reference voxel.

23. The article of claim 22, further comprising instructions causing a data processing device to:
generate a data structure, the data structure having a variable, c, representing a center of the reference voxel and a temporary variable, c'; and
set c' equal to c.

24. The article of claim 23, wherein instructions causing a data processing device to average the centers of each of the contributing voxels and the reference voxel comprises instructions causing a data processing device to add the centers of each of the contributing voxels to c'.

25. The article of claim 24, wherein instructions causing a data processing device to average the centers of each of the contributing voxels and the reference voxel comprises instructions causing a data processing device to scale c' by one over the number of contributing voxels.

26. The article of claim 22, wherein instructions causing a data processing device to determine comprises instructions causing a data processing device to:
evaluate a primary voxel corresponding to a side of a reference voxel, the side of the reference voxel being attached to an outside voxel, the primary voxel being adjacent to the outside voxel and adjacent to a corresponding secondary voxel, the secondary voxel being adjacent to a corresponding tertiary voxel; and
determine whether the primary voxel, the secondary voxel or the tertiary voxel is on a same surface as the reference voxel.

27. The article of claim 26, further comprising instructions causing a data processing device to:
evaluate up to eight primary voxels for each side of the reference voxel that is attached to the outside voxel; and
use a three by three by three (3×3×3) volume of voxels to include the eight primary voxels, the corresponding eight secondary voxels, and the corresponding eight tertiary voxels, the reference voxel being in the center of the 3×3×3 volume.

28. The article of claim 27, wherein instructions causing a data processing device to determine whether the primary voxel, the secondary voxel or the tertiary voxel is on a same surface as the reference voxel comprises instructions causing a machine to pick the primary voxel if the primary voxel is inside the surface of the object unless the corresponding secondary voxel is outside the surface of the object and the corresponding tertiary voxel is inside the surface of the object.

29. The article of claim 27, wherein instructions causing a data processing device to determine whether the primary voxel, the secondary voxel or the tertiary voxel is on a same surface as the reference voxel comprises instructions causing a data processing device to pick the secondary voxel if the primary voxel is outside the surface of the object and the secondary voxel is inside the surface of the object.

30. The article of claim 27, wherein instructions causing a data processing device to determine whether the primary voxel, the secondary voxel or the tertiary voxel is on a same surface as the reference voxel comprises instructions causing a data processing device to pick no voxels if the corresponding secondary voxel is outside the surface of the object and the corresponding tertiary voxel is inside the surface of the object.

* * * * *